United States Patent [19]
Chevion et al.

[11] Patent Number: 5,542,007
[45] Date of Patent: Jul. 30, 1996

[54] FORM DROPOUT COMPRESSION METHOD WHICH HANDLES FORM WHITE-OUT AND WRITING IN SHADED AND WHITE-OUT AREAS OF THE FORM

[75] Inventors: Dan Chevion, Haifa, Israel; Alon Gluska, South Burlington, Vt.; Ittai Gilat, Haifa, Israel

[73] Assignee: International Business Machines Corporation, Armonk, N.Y.

[21] Appl. No.: 143,820

[22] Filed: Oct. 27, 1993

[51] Int. Cl.⁶ .................................................. G06K 9/36
[52] U.S. Cl. ........................ 382/232; 382/308; 382/317
[58] Field of Search .............................. 382/56, 61, 55, 382/33, 232, 163, 166, 306, 317, 308, 254, 257, 258; 348/615, 616

[56] References Cited

U.S. PATENT DOCUMENTS

| | | | |
|---|---|---|---|
| 5,020,122 | 5/1991 | Walsh | 382/61 |
| 5,140,650 | 8/1992 | Casey | 382/61 |
| 5,191,612 | 3/1993 | Katsuyama | 382/61 |
| 5,202,933 | 4/1993 | Bloomberg | 382/33 |
| 5,272,764 | 12/1993 | Bloomberg | 382/55 |
| 5,317,646 | 5/1994 | Sang, Jr. | 382/61 |

*Primary Examiner*—Yon J. Couso
*Attorney, Agent, or Firm*—Ronald L. Drumheller

[57] ABSTRACT

An improved method is disclosed of compressing, for storage or transmission, the information contained in a bi-level digitized input image by separate handling of a corresponding template image and a compressed image, which method is capable of handling "white-out" areas of the image. In accordance with the method, the template image is subtracted from the input image to generate the compressed image, the subtraction is characterized in that the subtraction step determines, for each pixel, whether the pixel is a "removed pixel" and, if so, the pixel is assigned to be black in the compressed image. A pixel is a "removed pixel" if the corresponding pixel in the template image is black, and the corresponding pixel in the input image is white.

13 Claims, 5 Drawing Sheets

FORM DROPOUT COMPRESSION METHOD WHICH HANDLES FORM WHITE-OUT AND WRITING IN SHADED AND WHITE-OUT AREAS OF THE FORM

BACKGROUND OF THE INVENTION

1. Field of the Invention

The invention relates to methods and apparatus for compressing and decompressing digitally stored image information in cases where part of the image is invariant or standard, such as an image of a printed form, and thus does not contribute to the image information content.

2. Related Art

The digital processing of the information contained in documents generally involves the acquisition of the information by some reading device, the transformation of the acquired information into a machine readable code, the storing of the coded information for later, and possibly repeated processing, the actual processing of the information and finally the output of the results of the processing. This output may take visual form, as on a display unit or in print, or be purely electronic.

Generally the acquisition of the information by a reading device needs to be performed at a reasonably high resolution to avoid information loss and produces a high volume of scan data which requires a large memory capacity for storage. As a typical example a page of A4 size scanned at 100 pels/cm requires about 700 kbytes of storage space. To alleviate this problem document scanning systems are generally provided with some form of data compression capability to reduce the amount of storage required.

EP-A-0 411 231 discloses a compression/decompression scheme for scanned paper forms which achieves high compression ratios by removing template information common to all forms of the same type. The result of the compression of a form using this method is a compressed image consisting of the filled-in information only.

When reconstructing the form from its compressed form, the template data is superimposed on the image with the filled-in data to form the image of the original form. Such a method ensures that the image when encoded using conventional methods, such as run-end or run-length encoding, for storage or transmission will take up less space because the information content of the compressed form is reduced. This particular compression method has become known as 'Form Drop-Out'.

One problem with the prior art form drop-out method is that it is not capable of extracting changes made by erasure of parts of the template. For example, when signing a standard legal contract, there are situations in which some of the template text must be replaced by manual fill-ins on areas which are applied by some sort of "white-out" material, such as a sticker or correction fluid. Moreover, if information is added in such areas, the subtraction process will fail to extract it. The conventional method does not reconstruct the form in these areas correctly.

The reason for this is that the template data is changed and the conventional form drop-out method does not account for changes which may occur to the template data itself, the main assumption upon which the conventional form drop-out method is based being that filled-in information can only be added on to a form, when actually, as in the case of "white-out", template information is also removed from a form.

The conventional form drop-out method also performs poorly when filled-in data appears on areas where the template data is dense e.g. areas where the background consists of some dense spatial pattern of dots or lines. For such areas, all filled-in data is in close proximity to template data, and form drop-out, which is essentially a localized process, usually removes the filled-in information totally.

SUMMARY OF THE INVENTION

Accordingly a first aspect of this invention provides a method of compressing, for storage or transmission, the information contained in a bi-level digitized input image by separate handling of a corresponding template image and a compressed image. The method includes the steps of subtracting the template image from the input image to generate the compressed image. For each pixel, the subtraction step determines whether the pixel is an added pixel and, if so, the pixel is assigned to be black in the compressed image. A pixel is considered to be an added pixel if the corresponding pixel in the template image is white and the corresponding pixel in the input image is black. The subtraction step also determines, for each pixel, whether the pixel is a removed pixel and, if so, the pixel is assigned to be black in the compressed image. A pixel is considered to be a removed pixel if the corresponding pixel in the template image is black, and the corresponding pixel in the input image is white.

According to a second aspect of the this invention, there is provided a method of compressing, for subsequent storage or transmission, the information contained in a digitized bi-level input image by separate handling of a corresponding template image and a compressed image, characterized by the steps of, for at least part of the input image: (1) generating a thinned image from the part by setting to white each pixel therein corresponding to a black pixel in the input image which has a white neighbor in a distance which is less than or equal to n; (2) forming an expanded image from the thinned image by setting to black each white pixel therein which has a black neighbor in a distance which is less than or equal to m; and (3) performing a binary AND pixel-wise between the expanded image and the corresponding part of the input image.

Preferably the method further comprises the steps of, for the part, (4) performing a binary AND pixel-wise between the image resulting from step (3) and the corresponding part of the template image to form an intermediate image; and (5) performing a binary XOR between the intermediate image and the image resulting from step (3).

Generally the dense areas of a typical form are those to which white out material is most likely to be applied. Therefore in one particularly advantageous embodiment of the invention the two above described methods are combined to provide a method of compressing, for subsequent storage or transmission, the information contained in a digitized input image by separate handling of a corresponding template image and an output compressed image, the method comprising: forming a first compressed image from the input image and the template image using a method according to the second aspect of the invention; forming a second compressed image from the input image and the template image using a method according to the first aspect of the invention; performing a binary OR operation pixel-wise between the first and second compressed images to form the output image.

The invention thus enables an improved form-drop out method to be provided which is capable of handling documents with white-out areas which have been removed from the corresponding template and for which the template includes dense areas.

BRIEF DESCRIPTION OF THE DRAWING

The invention will be better understood by reference to the accompanying drawing, wherein:

FIG. 5 shows a template image of an empty form;

FIG. 6 shows a filled-in form involving both "white-out" areas and "dense" areas;

FIG. 7 shows a reconstruction of the filled-in form of FIG. 5 compressed using the conventional, prior art, form dropout;

FIG. 8 shows a reconstruction of the filled-in form of FIG. 5 compressed using the method of the embodiment of the invention;

DETAILED DESCRIPTION OF THE PREFERRED EMBODIMENT

Form drop-out, as described herein, deals with forms represented as digitized bi-level images where each pixel takes one of two possible values. It will be understood that the words 'black' and 'white' as used herein refer to these binary states and not necessarily to the actual color of the pixel when displayed or printed. These digitized form images can be acquired in any conventional manner using some form of scanning device or digitizing video camera. The scanning is performed line by line with a resolution of, in this embodiment, 100 pels/cm (250 pels/inch).

After a registration phase, in which an incoming form is aligned geometrically to fit a corresponding predefined template, a subtraction phase is used in order to locate and remove the template data from the input form. The method used is a subtraction process based on N×N neighborhoods.

In conventional form drop out processing, a pixel in the subtraction result image will be black if and only if the corresponding pixel in the filled-in form is black, and the corresponding pixel in the template is white, and either its neighborhood in the template is completely white, or there exists a black pixel in its neighborhood in the result image. The latter can be determined by repeatedly applying tests for the three conditions until the result image is no longer changed. The filled-in form can be reconstructed by using a simple binary OR operation between the template and the result images. This subtraction process will be referred to as "drop out" processing.

The drop out processing described above is not capable of extracting changes made by erasure of parts of the template. The method of this embodiment uses drop out processing as a first step and a "white out" processing as a second step. The two steps contribute to the result image pixels which will be referred to as "added" pixels and "removed" pixels respectively. The two processes are independent.

The "white out" processing is also based on N×N neighborhoods. A pixel in the "white-out" subtraction result will be black if and only if the corresponding pixel in the filled in form is white and the corresponding pixel in the template is black, and either its neighborhood in the filled-in form is completely white, or there exists a black pixel in its neighborhood in the white out subtraction image. The latter can be determined by repeatedly applying tests for the three conditions until the result image is no longer changed. The subtraction result is obtained by a binary OR operation between the results of the two processes, i.e. between the drop out subtraction result and the white-out subtraction result images.

Figure 1A:
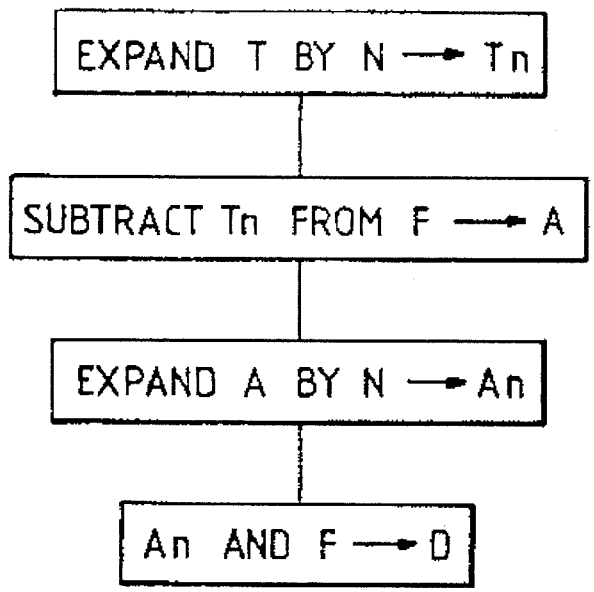
FIGS. 1a and 1b are flow diagrams showing the algorithms used for detection of added pixels and removed pixels in the embodiment of the invention.
Figure 1B:
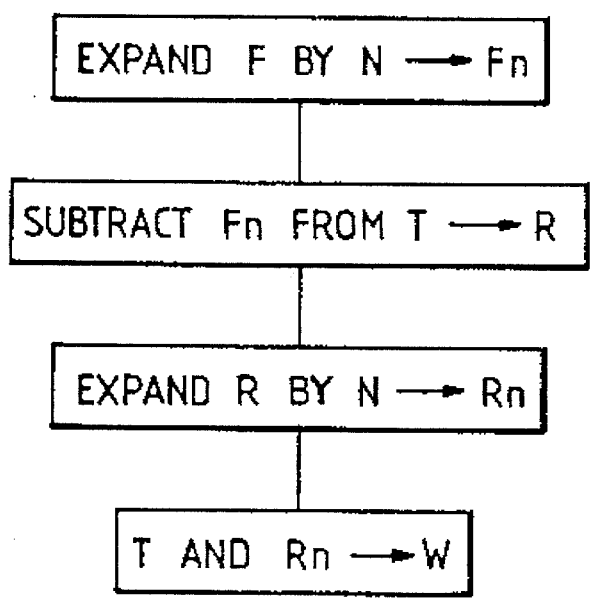

In the preferred embodiment the detection of added pixels and removed pixels is achieved using the efficient one-pass algorithms shown in FIGS. 1a and 1b.

Referring to FIG. 1a, the added pixel detection algorithm is as follows. The template image T is first expanded by N pixels to form an intermediate image Tn, i.e. the operation: if Neighbor(T,i,j,N)= white then Tn(i,j)= black else Tn(i,j)= white is performed for the pixels (i,j) of the image, where Neighbor(a,i,j,N) returns white if all the pixels a (k,l) such that i−N≦k≦i+N and j−N≦l≦j+N are white. Next, Tn is subtracted from the filled in form F to form intermediate image A, i.e, the operation if F (i,j)=black and Tn (i,j)=white then A(i,j)=black else A(i,j)=white is performed. The intermediate image A is expanded by N to form intermediate image An. Lastly an AND operation is performed between An and F to form result image D.

Referring to FIG. 1b, the detection of removed pixels is the same as the detection of the added pixels except that T and F are interchanged. Thus filled-in form F is expanded by N to form intermediate image Fn, Fn is subtracted from template T to form intermediate image R. R is expanded by N to form intermediate image Rn and a logical AND operation is performed between T and Rn to form result image W.

The final subtraction result is obtained by a binary OR operation between D and W.

The algorithms described above will fail to detect added information which is either thinner than N or for which the distance between each of its pixels and any template pixel is less than N or for which the distance between each of its pixels and any detectable added pixel is greater than N. However, such patches are rare, and usually (especially for small N, say N=2 or 3) their absence has no effect on the reconstructed form.

In dense template areas, both drop-out processing and the white-out processing fail to extract the filled-in data, since the template neighborhoods in dense areas are never totally white. This causes the third condition of the subtraction process to neglect all black fill-in pixels in such areas.

In this embodiment such "dense areas" are handled as follows. For each template form, the dense areas are first detected and stored as a list of rectangles. This detection is done in a preprocessing step by expanding the template by e pixels and then looking for blocks which become totally black by the expansion. These blocks are considered as dense blocks, and all the others are considered sparse. The detection process depends only on template data, and therefore is done off-line when analyzing the template form. e has to be large enough so as to cause dense pattern areas to become totally black, and small enough so that other areas will not. For the template image in FIG. 4, digitized with 100 pels/cm (240 pels/inch), e was chosen to be 3. In this embodiment the dense blocks have a minimum size of 16×16 pixels. The optimum choice for e and the minimum size of the dense blocks will depend on the scanning resolution and the typical width of the lines in the dense area.

In the subtraction process, these dense blocks of the filled-in form are processed by performing the following n each:

1. Thinning by n pixels, i.e. each black pixel which has a white neighbor in a distance which is less than or equal to n is set to white. Filled-in information is usually thicker than the fine detail found in dense areas of forms. Therefore, when thinning a filled-in form in dense areas, the template information vanishes, while parts of the filled-in data remain. The thinning parameter n is determined when detecting the dense areas, and set to the minimal value for which these areas vanish when thinning. In this embodiment n is set to 2.
2. Expansion of the thinning result by m pixels (m larger than n), i.e. each white pixel which has a black neighbor in a distance which is less than or equal to m will be set to black. m is larger than n so that all the filled-in information in a dense block will be recovered. In this embodiment m is set to 4.
3. Perform a binary AND between the filled-in form and the expansion result. This leaves us with all the filled-in data and some template data near by.
4. Perform a binary AND between the result of step 3 and the template image. This will leave us with the template data which is near filled-in data.
5. Perform a binary XOR between the result of step 4 and the result of step 3. This will leave the filled-in data alone.

The sparse blocks (i.e. those that are not dense blocks) of the form are processed using the drop-out and/or white-out processing. The overall result is a combination of that obtained by the dense areas processing and that obtained by the drop-out/white-out processing; for a sparse block, the result will be that of drop out/white-out processing, and for a dense block, the result will be that of the thinning/expansion processing described above.

This process will be hereinafter referred to as "dense areas" processing. Reconstruction of the original form from the result of the "dense areas" processing can be accomplished by performing a binary XOR between the template image and the result of the procedure described above.

Figure 2:
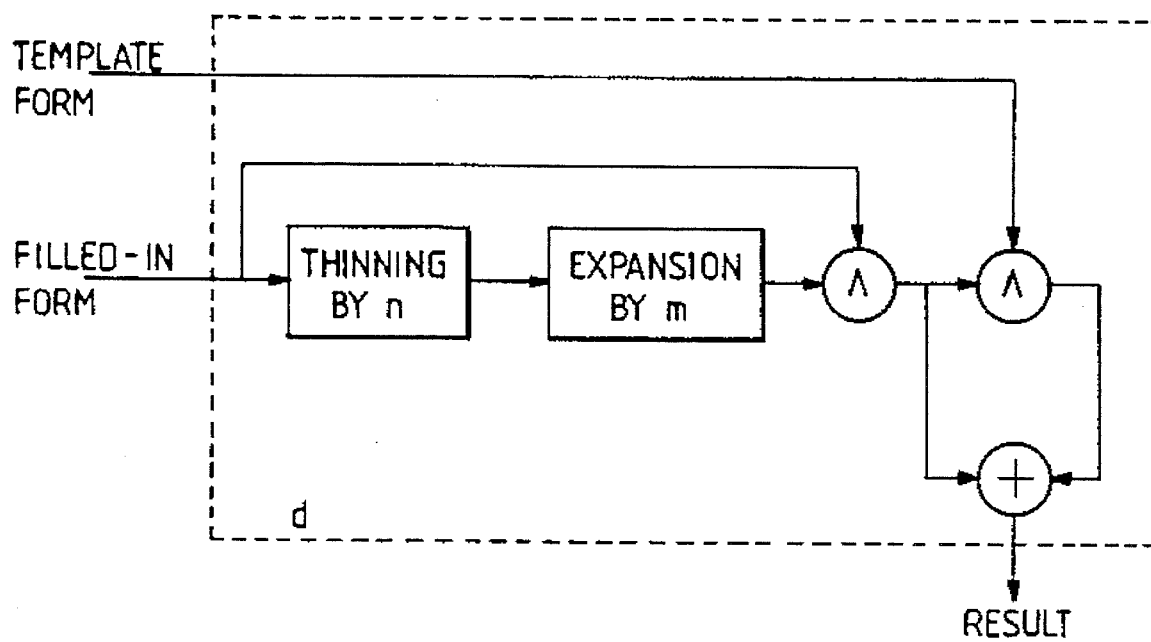
FIG. 2 is a block diagram representing the "dense area" processing of the embodiment of the invention.

FIG. 2 shows a block diagram describing this "dense areas" processing. This diagram applies only for "dense areas" as defined by the dense areas detection. The upside down 'V's represent binary AND operations and the '+' block represents a binary XOR operation.

In this embodiment, the "dense areas" processing and the "white-out" processing are combined in the following manner:

First, "white-out" processing is performed on the input image. This produces a "white-out" image which is black wherever the original filled-in form and the template image are different, excluding filled-in data in dense areas which will not be extracted.

Next, "dense areas" processing is performed on the input image. This produces a "dense areas" image which is black wherever there is filled-in data in the filled-in form.

Finally, a binary OR operation is performed between the "dense area" image and the "white-out" image to form the final compressed image.

Figure 3:
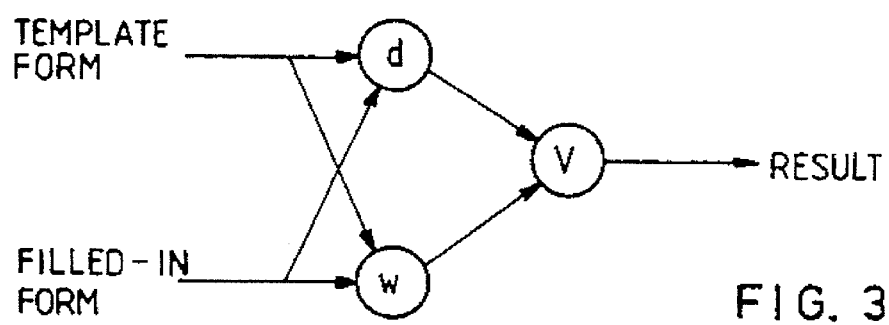
FIG. 3 is a block diagram representing the combination of "dense area" processing and "white-out" processing in the embodiment of the invention.

FIG. 3 shows a block diagram describing the combined "white-out" and "dense areas" processing. The 'd' represents the "dense areas" processing, the 'w' represents the "white-out" processing, and v represents a binary OR operation.

Figure 4:
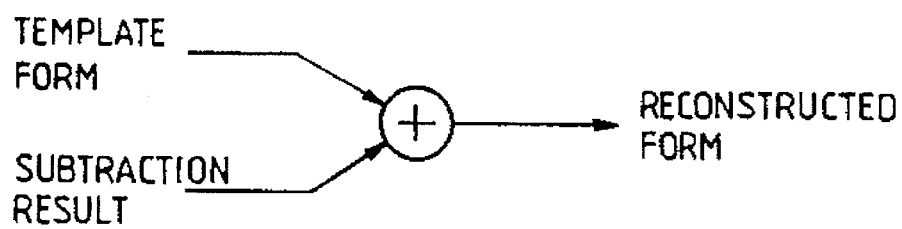
FIG. 4 is a block diagram of image reconstruction in the embodiment of the invention.

The reconstruction of the filled-in form is obtained by performing a binary XOR between the result of the previous step and the template image. FIG. 4 shows a block diagram describing the reconstruction of a form from the template image and the Form drop-out result.

FIGS. 5 to 8 show the results of the compression and reconstruction of a filled-in form using the method of this embodiment of the invention.

Figures 5, 6:
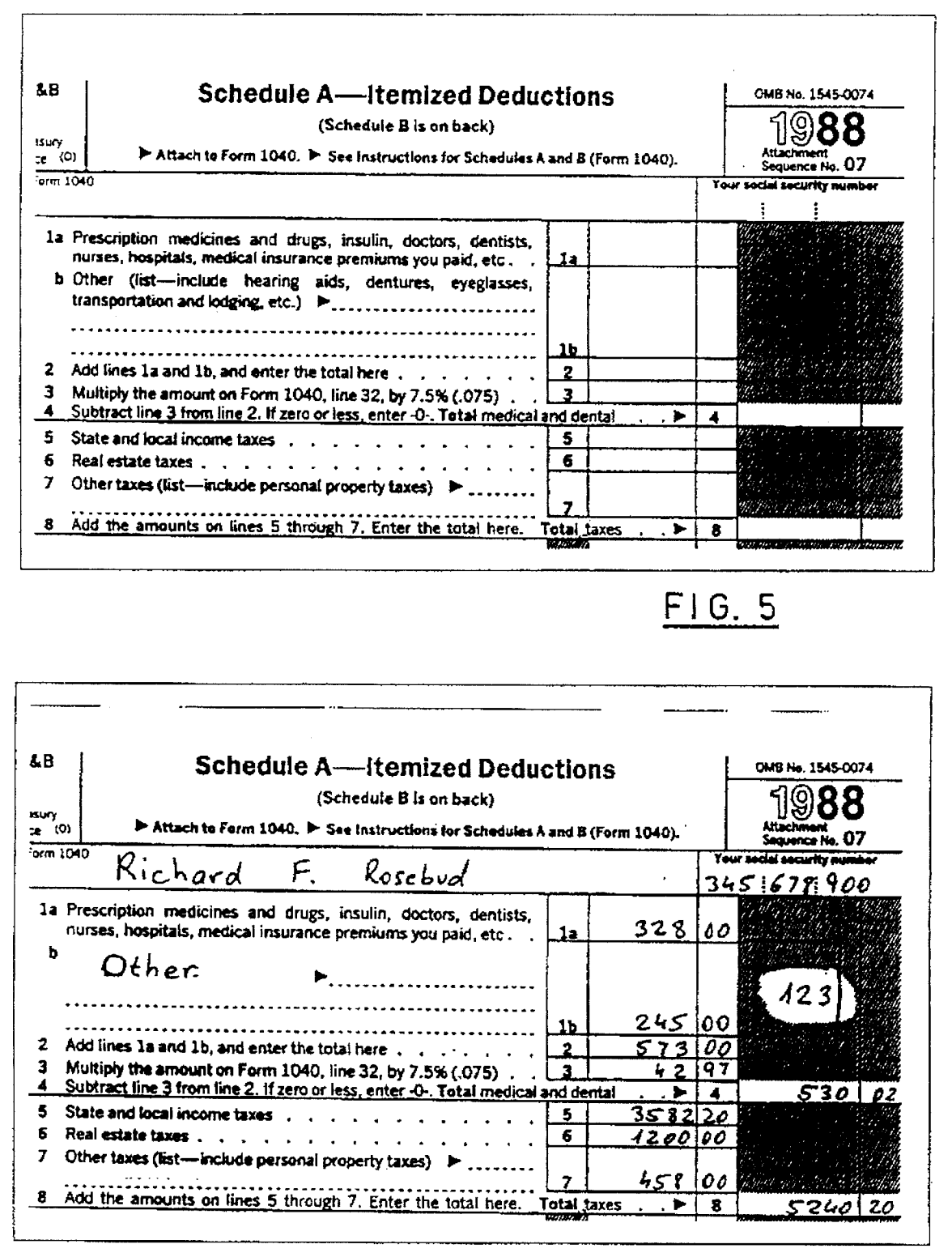

FIG. 5 shows the top part of an empty form. FIG. 6 shows the same form after filling in. The filling includes "white-out": 1) line b of "Medical and Dental Expenses" is erased and overwritten by "other" in handwriting, 2) the top dark area on right is applied with "white-out" and overwritten by "123" with a vertical line to its right. It includes fill-in data in dense areas as well: "1991" is written under the social security number.

Figures 7, 8:
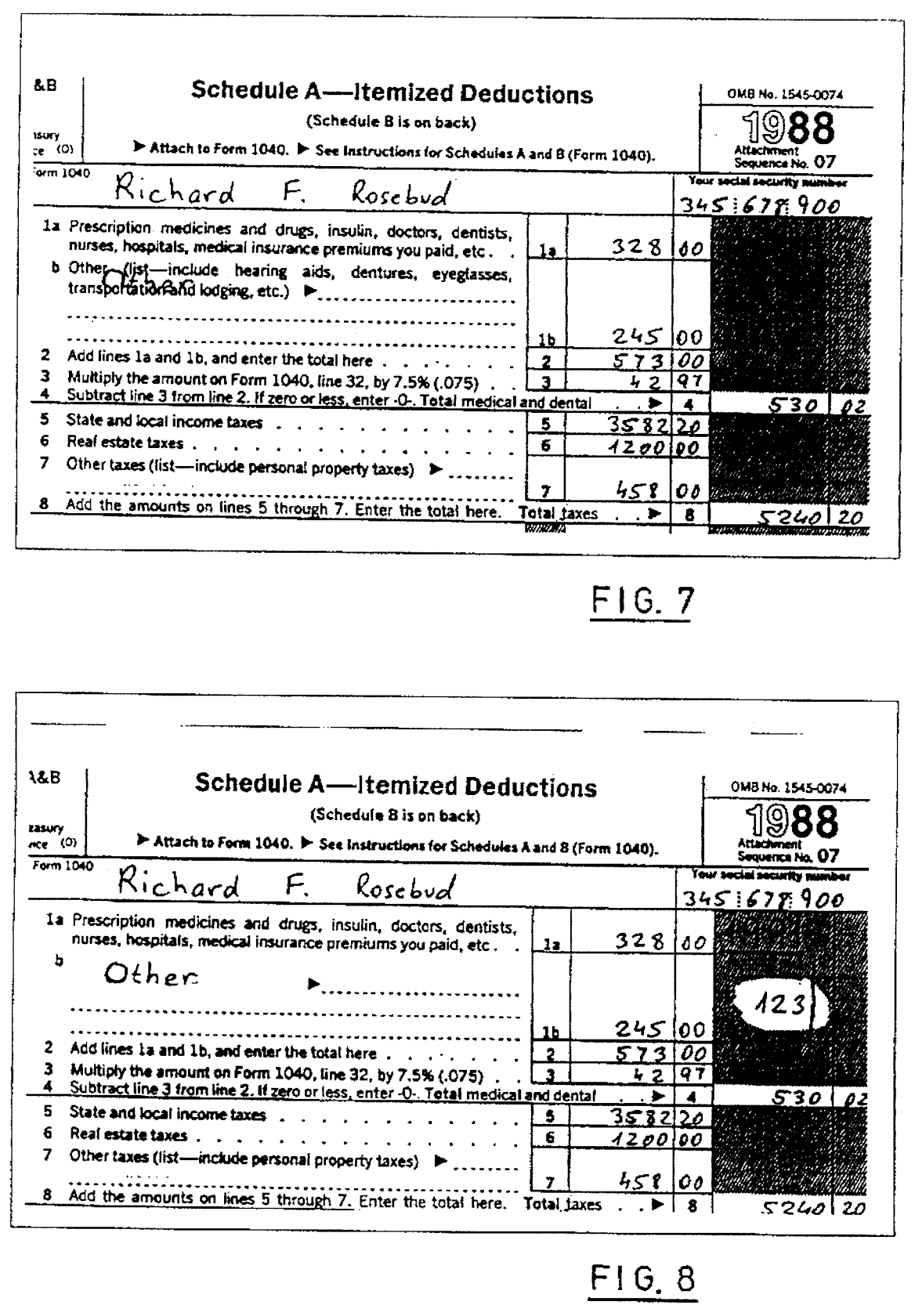

FIG. 7 shows the result of compressing and subsequently reconstructing the filled-in from using conventional form drop-out. In FIG. 7 it can be seen that conventional form drop-out fails to reconstruct the filled-in form properly. The template information originally applied with "white-out" is not erased, and the fill-in in the dense areas is totally lost.

FIG. 8 is a reconstruction of FIG. 6 processed by the method of this embodiment of the invention including "white-out" and "dense areas" processing. In this case "white-out" is reconstructed correctly, as well as the filled-in data in the dense areas on the right.

It can be seen in FIG. 8 that there is a dramatic improvement in the resulting form quality in areas applied by "white-out" and very dense template areas. Without this enhancement to Form drop-out, white-outs would not be detected or reconstructed properly, and filled-in data in dense template areas would be totally lost. For some forms, such as legal contracts, tax payment forms and insurance application forms, where all filled-in data is important for the legibility of the form, these capabilities are crucial for building computerized form applications using Form drop-out.

The solution to the problems of "white-out" and "dense areas" in the filled-in form could also be accomplished by the following hybrid block method:

a. Divide the template and a filled-in form into non-overlapping blocks covering the whole image space. Generate a bitmap containing a bit for each block, and set it to 0's.

b. For each block, decide whether or not it contains "white-out" in the filled-in block. If the decision is true, set the corresponding bit in the bitmap to 1, and copy the block from the filled-in form to the result. The decision can be based on the number of pixels in the block which are white in the filled-in block and black in the template block. Any other appropriate decision function may be suitable.

c. For each block, decide whether or not it contains filled-in data. If the decision is true, set the corresponding bit in the bitmap to 1 and copy the block from the filled-in form to the result. The decision can be based on thinning the filled-in block by a predetermined value and counting the number of black pixels which remain in the block after thinning. If this number exceeds a threshold, the decision is true. Any other appropriate decision function may be suitable.

d. On each block for which the decisions of steps b and c were false (i.e. the corresponding bit in the bitmap is 0 after performing steps b and c, perform the conventional Form drop-out.

e. The resulting image is a combination of conventional Form drop-out blocks and original blocks copied from the filled-in form, determined by the corresponding bits in the bitmap. The reconstruction of the form is accomplished by performing a binary OR between blocks of the result image and the template form for which the corresponding bit in the bitmap is 0. The blocks for which the corresponding bit in the bitmap is 1 are copied from the result image to the reconstruction image.

Figure 9:
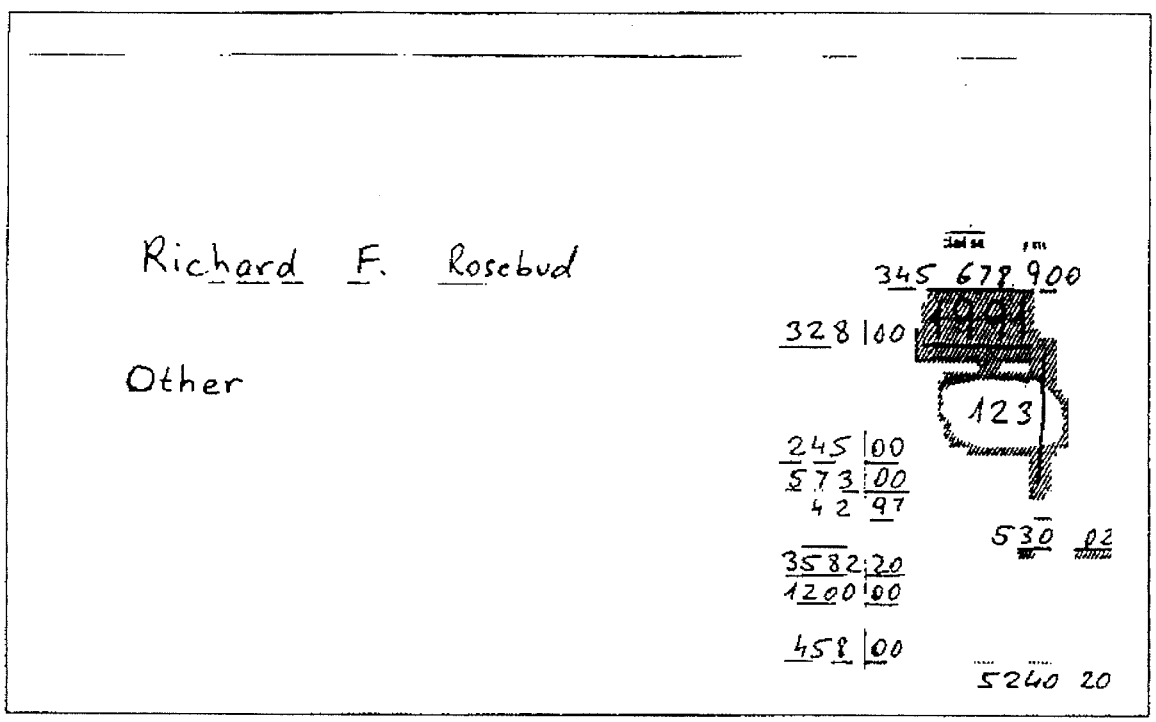
FIG. 9 shows the compressed image generated using the hybrid block method.
Figure 10:
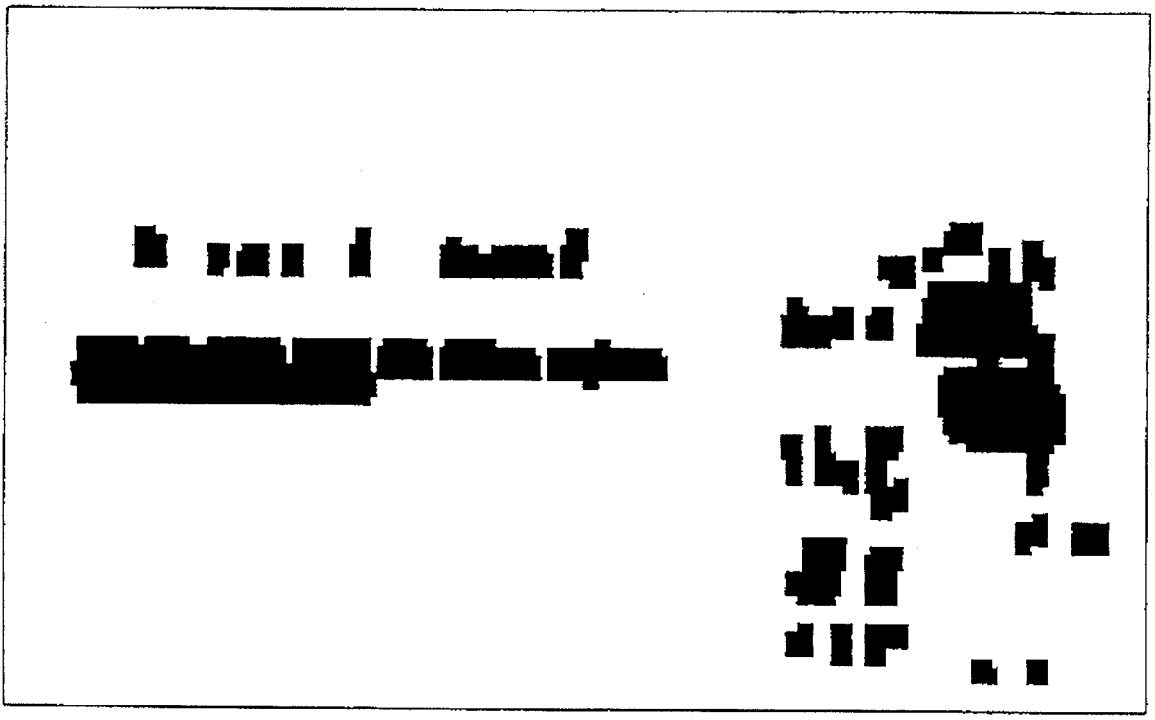
FIG. 10 shows the bitmap generated by the hybrid block method.

FIG. 9 shows the result of the proposed hybrid block method, as applied to FIG. 6. Blocks with "white-out" and filled-in data in "dense areas" are copied, while others are processed by ordinary Form drop-out. FIG. 10 shows the corresponding bitmap. Black blocks correspond to 2's in the bitmap, and white blocks correspond to 0's.

Now that the invention has been described by way of the preferred embodiment, various modifications and improvements will occur to those of skill in the art. Thus, it should be understood that the preferred embodiment has been described by way of example and not as a limitation. The scope of the invention is defined by the appended claims.

Having thus described our invention, what we claim as new and desire to secure Letters Patent is as follows:

1. A method of compressing, for storage or transmission, the information contained in a bi-level digitized input image of a filled-in form by separate handling of a corresponding template image of a blank form and a compressed image of modifications to the blank form, the method comprising:

a subtraction step of subtracting the template image from the input image to generate the compressed image, the subtraction step comprising determining for each pixel whether the pixel is an added pixel and, if so, assigning the pixel to be black in the compressed image, wherein a pixel is an added pixel if the corresponding pixel in the template image is white and the corresponding pixel in the input image is black, the subtraction step further comprising the step of determining for each pixel whether the pixel is a removed pixel and, if so, assigning the pixel to be black in the compressed image, wherein a pixel is a removed pixel if the corresponding pixel in the template image is black, and the corresponding pixel in the input image is white.

2. The method of claim 1 wherein a pixel is a removed pixel if and only if either the neighborhood of the corresponding pixel in the input image is white or there is a pixel in the neighborhood of the pixel which is a removed pixel.

3. The method of claim 2 wherein the step of determining for each pixel whether the pixel is a removed pixel comprises the steps of:

(a) expanding the input image by setting to black each pixel therein which has a black neighbor in a distance less than or equal to N to form a first intermediate image;

(b) subtracting the first intermediate image pixel-wise from the template image to form a second intermediate image;

(c) expanding the second intermediate image by setting to black each pixel therein which has a black neighbor in a distance less than or equal to N to form a third intermediate image; and (d) performing a binary AND pixelwise between the third intermediate image and the template image to form an image in which the black pixels are removed pixels.

4. A method of compressing, for subsequent storage or transmission, the information contained in a digitized input image by separate handling of a corresponding template image and an output compressed image, the method comprising the steps of:

forming a first compressed image from the input image and the template image by way of white out processing;

forming a second compressed image from the input image and the template image by way of dense areas processing;

performing a binary OR operation pixel-wise between the first and second compressed images to form the output image.

5. A method of compressing, for storage or transmission, the information contained in a bi-level digitized input image by separate handling of a corresponding template image and a compressed image, the image comprising a plurality of non-overlapping blocks, the method comprising the steps of:

(a) determining for each block whether or not the block contains white-out pixels and, if so, copying the block to the compressed image and setting to 1 a corresponding bit in a bitmap, which bitmap has one bit for each image block; and (b) determining for each block whether the block contains filled-in data and, if so, copying the block to the compressed image and setting to 1 the corresponding bit in the bitmap;

(c) compressing each block for which the corresponding bit in the bitmap is 0 using a method comprising subtracting therefrom the corresponding block in the template image to generate the corresponding block in the compressed image, the subtraction step comprising determining for each pixel whether the pixel is an added pixel and, if so, assigning the pixel to be black in the compressed image, wherein a pixel is an added pixel if the corresponding pixel in the template image is white and the corresponding pixel in the input image is black.

6. The method of claim 5 wherein the step of determining whether the block contains filled-in data comprises the further steps of:

(i) thinning the block in the input image by setting to white each black pixel therein which has a white neighbor in a distance less than or equal to N; and (ii) determining whether the number of black pixels remaining in the block exceeds a predetermined threshold value and, if so, determining that the block contains filled-in data.

7. An image processing apparatus for compressing, for storage or transmission, the information contained in a bi-level digitized input image by separate handling of a corresponding template image and a compressed image, comprising subtraction logic for subtracting the template image from the input image to generate the compressed image, wherein the subtraction logic comprises:

logic for determining for each pixel whether the pixel is an added pixel and, if so, assigning the pixel to be black in the compressed image, wherein a pixel is an added pixel if the corresponding pixel in the template image is white and the corresponding pixel in the input image is black, wherein the subtraction logic comprises logic for determining for each pixel whether the pixel is a removed pixel and, if so, assigning the pixel to be black in the compressed image, wherein a pixel is a removed pixel if the corresponding pixel in the template image is black, and the corresponding pixel in the input image is white.

8. Apparatus for compressing, for storage or transmission, the information contained in a bi-level digitized input image of a filled-in form by separate handling of a corresponding template image of a blank form and a compressed image of modifications to the blank form, comprising:

means for subtracting the template image from the input image to generate the compressed image, said means for subtracting comprising means for determining for each pixel whether the pixel is an added pixel and, if so, assigning the pixel to be black in the compressed image, wherein a pixel is an added pixel if the corresponding pixel in the template image is white and the corresponding pixel in the input image is black, said means for subtracting further comprising means for determining for each pixel whether the pixel is a removed pixel and, if so, assigning the pixel to be black in the compressed image, wherein a pixel is a removed pixel if the corresponding pixel in the template image is black, and the corresponding pixel in the input image is white.

9. The apparatus of claim 8 wherein a pixel is a removed pixel if and only if either the neighborhood of the corresponding pixel in the input image is white or there is a pixel in the neighborhood of the pixel which is a removed pixel.

10. The apparatus of claim 9 wherein the means for determining for each pixel whether the pixel is a removed pixel comprises:

(a) means for expanding the input image by setting to black each pixel therein which has a black neighbor in a distance less than or equal to N to form a first intermediate image;

(b) means for subtracting the first intermediate image pixel-wise from the template image to form a second intermediate image;

(c) means for expanding the second intermediate image by setting to black each pixel therein which has a black neighbor in a distance less than or equal to N to form a third intermediate image; and (d) means for performing a binary AND pixelwise between the third intermediate image and the template image to form an image in which the black pixels are removed pixels.

11. Apparatus for compressing, for subsequent storage or transmission, the information contained in a digitized input image by separate handling of a corresponding template image and an output compressed image, comprising:

means for forming a first compressed image from the input image and the template image by way of white out processing;

means for forming a second compressed image from the input image and the template image by way of dense areas processing; and means for performing a binary OR operation pixel-wise between the first and second compressed images to form the output image.

12. Apparatus for compressing, for storage or transmission, the information contained in a bi-level digitized input image by separate handling of a corresponding template image and a compressed image, the image comprising a plurality of non-overlapping blocks, comprising:

(a) means for determining for each block whether or not the block contains white-out pixels and, if so, copying the block to the compressed image and setting to 1 a corresponding bit in a bitmap, which bitmap has one bit for each image block;

(b) means for determining for each block whether the block contains filled-in data and, if so, copying the block to the compressed image and setting to 1 the corresponding bit in the bitmap;

(c) means for compressing each block for which the corresponding bit in the bitmap is 0 using a method comprising the steps of subtracting therefrom the corresponding block in the template image to generate the corresponding block in the compressed image, the subtraction step comprising determining for each pixel whether the pixel is an added pixel and, if so, assigning the pixel to be black in the compressed image, wherein a pixel is an added pixel if the corresponding pixel in the template image is white and the corresponding pixel in the input image is black.

13. The apparatus of claim 12 wherein the means for determining whether the block contains filled-in data comprises:

(i) means for thinning the block in the input image by setting to white each black pixel therein which has a white neighbor in a distance less than or equal to N; and (ii) means for determining whether the number of black pixels remaining in the block exceeds a predetermined threshold value and, if so, determining that the block contains filled-in data.

\* \* \* \* \*